Figure 1:
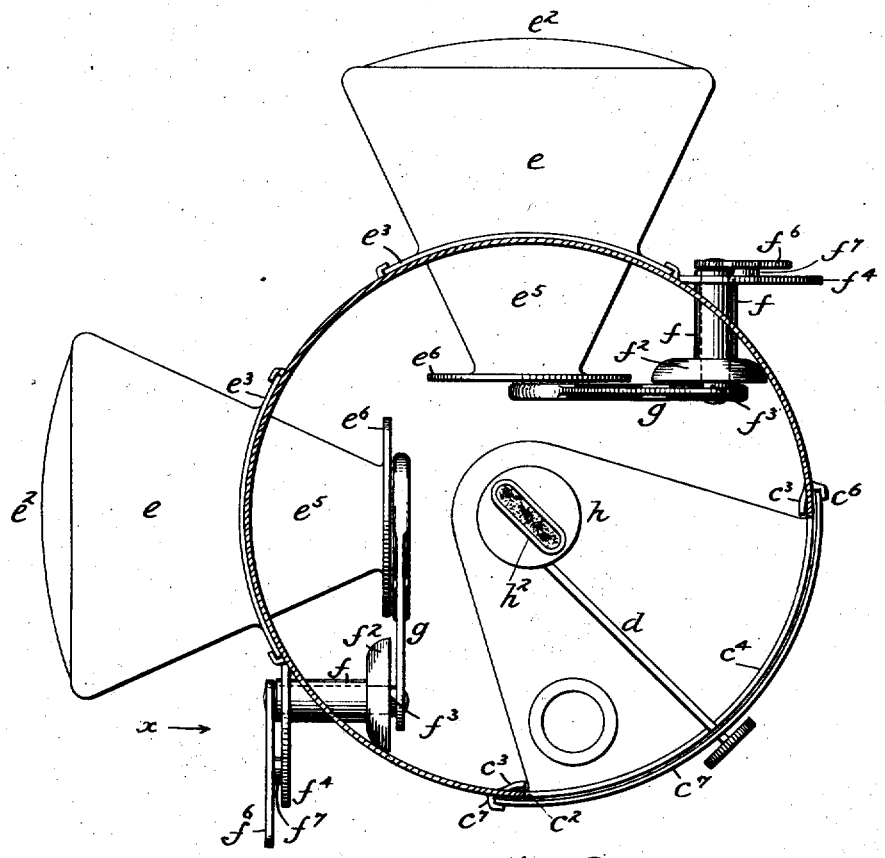

No. 12,142. REISSUED AUG. 4, 1903.

S. & J. WEBER.

SIGNAL LANTERN.

APPLICATION FILED APR. 23, 1903.

2 SHEETS—SHEET 1.

WITNESSES

Sidney P. Kingsworth

C. B. Bull

INVENTORS

Samuel Weber

Jacob Weber, by G. H. W. Howard, Attorneys.

No. 12,142. REISSUED AUG. 4, 1903.

S. & J. WEBER.

SIGNAL LANTERN.

APPLICATION FILED APR. 23, 1903.

2 SHEETS—SHEET 2

WITNESSES

Sidney P. Hollingsworth

C. B. Bull

INVENTORS

Samuel Weber,

Jacob Weber, by W. W. T. Howard, Attorneys.

No. 12,142. Reissued August 4, 1903.

UNITED STATES PATENT OFFICE.

SAMUEL WEBER AND JACOB WEBER, OF NEW YORK, N. Y.

SIGNAL-LANTERN.

SPECIFICATION forming part of Reissued Letters Patent No. 12,142, dated August 4, 1903.

Original No. 714,073, dated November 18, 1902. Application for reissue filed April 23, 1903. Serial No. 154,102.

*To all whom it may concern:*

Be it known that we, SAMUEL WEBER and JACOB WEBER, citizens of the United States, residing at New York, in the county of New York and State of New York, have invented certain new and useful Improvements in Signal-Lanterns, of which the following is a full and complete specification, such as will enable those skilled in the art to which it appertains to make and use the same.

The object of this invention is to provide an improved signal-lantern of the class usually employed on railways and which is designed for use as a railway signal-lantern and for other and similar purposes; and with this and other objects in view the invention consists of a signal-lantern constructed as hereinafter described.

The invention is fully disclosed in the following specification, of which the accompanying drawings form a part, in which the separate parts of our improvement are designated by suitable reference characters in each of the views, and in which—

Figure 3:
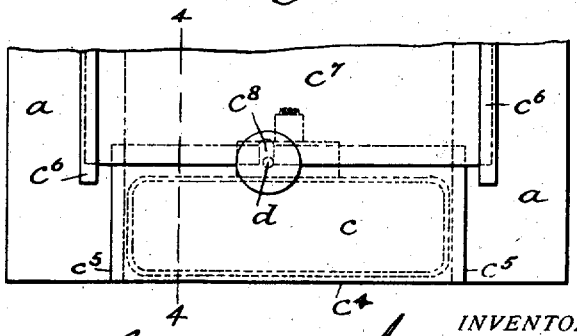
Figure 2:
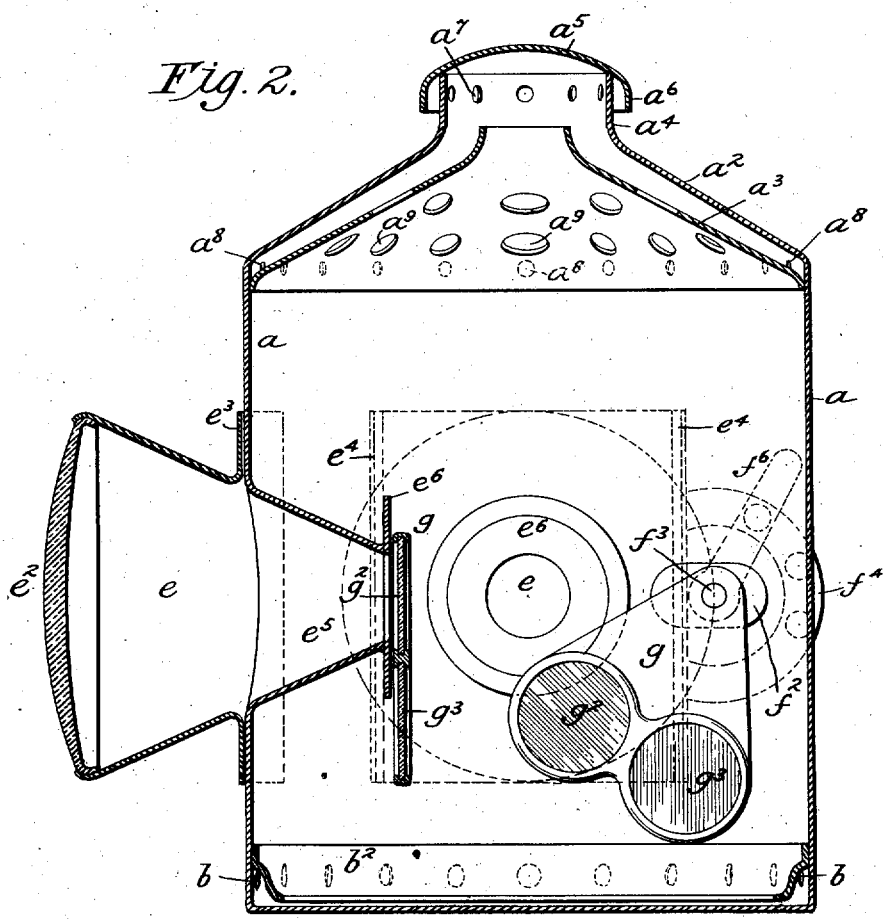
Figure 4:
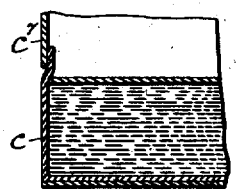
Figure 5:
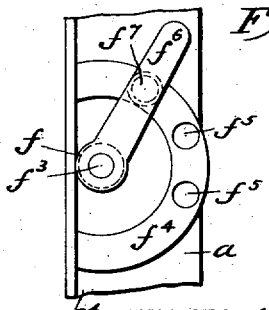

Figure 1 is a sectional plan view of our improved signal-lantern. Fig. 2 is a sectional side elevation thereof; Fig. 3, a bottom side view of a part of the lantern; Fig. 4, a section on the line 4 4 of Fig. 3, and Fig. 5 a side view of a detail of the construction looking in the direction of the arrow $x$ of Fig. 1.

In the practice of our invention we provide a main body $a$, which is of the usual cylindrical form and which is provided with a main outer dome $a^2$ and a supplemental inner dome $a^3$, and the main outer dome is provided with an upwardly-directed tubular extension $a^4$, having a cap $a^5$, provided with a downwardly-directed rim $a^6$, which incloses ports or passages $a^7$, formed in the upwardly-directed tubular extension $a^4$ of the dome $a^2$. Around the base portion of the dome $a^2$ are formed ports or passages $a^8$, which are shown in full and dotted lines in Fig. 2, and other ports or passages $a^9$ are formed in the inner or supplemental dome $a^3$.

The bottom of the body $a$ is closed, as shown in Fig. 2, and around the bottom portion are ports or passages $b$, and secured over said ports or passages $b$ on the inner side of the body $a$ is a guard flange or plate $b^2$, which is curved downwardly and inwardly, so that the air passing in through the ports or passages $b$ will be deflected downward and upward to the burner, as hereinafter described.

Within the bottom of the body $a$ is placed a lamp-reservoir $c$, which is preferably triangular in form, and the bottom portion of said body is cut out at one side to form an opening $c^2$, through which the reservoir $c$ is inserted, and the side walls of the body $a$ at the opposite sides of the opening $c^2$ are curved inwardly to form flanges $c^3$, and the outer side $c^4$ of the reservoir $c$ is projected at the opposite sides, as shown at Fig. 3, to form lips $c^5$, which overlap the flanges $c^3$.

At the opposite sides of the opening $c^2$, through which the reservoir $c$ is inserted and removed, are placed vertically-arranged keepers $c^6$, in which is placed a vertically-movable slide $c^7$, and in order to remove the reservoir $c$ the slide $c^7$ is raised, and when the reservoir has been inserted into position said slide is lowered, as shown in Fig. 3, and the bottom edge thereof overlaps the top portion of the reservoir and holds it in place, and said slide is provided in the bottom edge thereof with a vertically-arranged slot or recess $c^8$ (shown in dotted lines in Fig. 3) to accommodate the wick-raising shaft $d$, which passes outwardly and is adapted to be operated from the outside of the lantern.

At different sides of the body $a$ and separated by one-quarter of the circumference thereof are placed conical casings $e$, each of which is provided with a glass $e^2$, and these casings are composed of two parts, the outer part of each being secured to or formed integrally with a slide-plate $e^3$, held in position by vertically-arranged keepers $e^4$, secured to the side of the body $a$, while the inner part $e^5$ is formed integrally with or connected with the body $a$ and is stationary. The inner parts $e^5$ of the casings $e$ are provided at the inner and smaller ends each with a collar or flange $e^6$, and these collars or flanges are arranged at right angles to each other and preferably at about one-half of the distance between the center of the body $a$ and the sides thereof.

At the sides of each of the casings $e$ a tubular bearing $f$ is secured in the body $a$, and at the inner end of each of these bearings is a flange or plate $f^2$, and passing through each of the bearings $f$ is a shaft $f^3$. (Shown in dotted lines in Fig. 1 and in full lines in Figs. 2 and 5.) Secured to the body $a$ and at the outer ends of the bearings $f$ are segmental plates $f^4$, having holes $f^5$, and secured to the outer ends of the shafts $f^3$ are spring-arms $f^6$, provided on the inner sides with pins $f^7$, adapted to enter the holes $f^5$ in the plates $f^4$.

Connected with the inner ends of the shafts $f^3$ are triangular frames, plates, or parts $g$, each of which carries two glasses $g^2$ and $g^3$, the upper glass $g^2$ being green and the bottom glass $g^3$ red, and the supports $g$ of the glasses $g^2$ and $g^3$ are adapted to be raised, so as to place either of said glasses over the corresponding casing, and in this operation the supports $g$ move closely adjacent to the corresponding flanges $e^6$ of the adjacent casings.

The lamp-reservoir $c$ is provided with the usual burner $h$ and wick-tube $h^2$, and these parts may be of any desired construction, as may also the wick-adjusting device.

In the operation of the lantern the air enters through the ports or passages $b$ and the products of combustion pass up through the inner or the supplemental dome $a^3$ and out through the passages $a^7$, and the air also enters through the ports or passages $a^8$ and passes up between he domes $a^2$ and $a^3$ and out through the ports or passages $a^7$, and this construction improves the draft and prevents the outer dome $a^2$ from overheating.

Any desired number of the casings may be employed, from one to four, it being understood that the parts which carry and operate the glass-supports $g$ and including said supports will be similarly regulated as to number and location.

It will be observed that the bearings $f$ and shaft $f^3$ are parallel with the axes of the casings $e$, and the glass-holders $g^2$ are thus moved in a vertical plane at the inner ends of said casings, and either glass may be held over or adjacent to the inner ends of said casings by means of the spring-arms $f^6$ and the pins $f^7$, operating in connection with the plates $f^4$.

The object of making the casings of separate parts is to provide means for cleaning said casings, changing the lenses $e^2$, and also to facilitate the cleaning of the glasses $g^2$ and $g^3$ or the sides thereof adjacent to the casings, and the inner sides of said glasses may be cleaned through the opening $c^2$ in the body $a$ when the lamp-reservoir $c$ is removed.

Having fully described our invention, what we claim as new, and desire to secure by Letters Patent, is—

1. A signal-lantern, the body of which is provided with radially-arranged casings, the inner ends of said casings being open, and bearings passing through the sides of the body parallel with the axes of the casings, shafts mounted in said bearings, glass-holders connected with the inner ends of said shafts and adapted to be moved thereby adjacent to the inner ends of said casings, plates secured to the outside of said body, adjacent to the outer ends of said bearings and spring-arms connected with the outer ends of said shafts and provided with pins adapted to enter holes formed in said plates, substantially as shown and described.

2. A signal-lantern whose body is provided with a radially-arranged casing, said casing being frusto-conical in form and the smaller end thereof being directed inwardly and open, the outer end of the casing being formed separately from the inner end and being detachably connected with the body of the lantern, substantially as shown and described.

In testimony whereof we have hereunto set our hands this 26th day of January, 1903.

S. WEBER.
JACOB WEBER.

Witnesses:
H. C. KENDALL HESTER,
ANNA M. MALLON.